(12) United States Patent
Lidström

(10) Patent No.: US 9,383,052 B2
(45) Date of Patent: Jul. 5, 2016

(54) METHOD AND DEVICE FOR THE WELDING OF PIPES

(75) Inventor: Kjell Lidström, Bureå (SE)

(73) Assignee: TSC INNOVATION AB, Umeå (SE)

( * ) Notice: Subject to any disclaimer, the term of this patent is extended or adjusted under 35 U.S.C. 154(b) by 246 days.

(21) Appl. No.: 13/978,337

(22) PCT Filed: Dec. 30, 2011

(86) PCT No.: PCT/SE2011/051611
§ 371 (c)(1),
(2), (4) Date: Jul. 3, 2013

(87) PCT Pub. No.: WO2012/093959
PCT Pub. Date: Jul. 12, 2012

(65) Prior Publication Data
US 2013/0284342 A1    Oct. 31, 2013

(30) Foreign Application Priority Data
Jan. 4, 2011 (SE) ........................ 1150005

(51) Int. Cl.
*B32B 41/00*    (2006.01)
*F16L 47/03*    (2006.01)
(Continued)

(52) U.S. Cl.
CPC ............... *F16L 47/03* (2013.01); *B29C 65/344* (2013.01); *B29C 65/3448* (2013.01); *B29C 65/3468* (2013.01); *B29C 65/7841* (2013.01); *B29C 66/1122* (2013.01); *B29C 66/30341* (2013.01); *B29C 66/5326* (2013.01); *B29C 66/53241* (2013.01); *B29C 66/727* (2013.01); *B29C 66/72321* (2013.01); *B29C 66/81471* (2013.01); *B29C 66/81875* (2013.01); *B29C 66/8286* (2013.01); *B29C 66/9121* (2013.01); *B29C 66/91214* (2013.01); *B29C 66/91221* (2013.01); *B29C 66/91313* (2013.01);
(Continued)

(58) Field of Classification Search
CPC ................ B29C 65/34; B29C 66/5221; B29C 66/91221; B29C 66/91311; B29C 66/91411; B29C 66/91653; B29C 66/91655; B29C 66/961; G01K 7/38
USPC ............ 219/109, 110, 497, 505, 536; 156/64, 156/158, 272.2, 304.6, 359, 368, 378; 403/270
See application file for complete search history.

(56) References Cited

U.S. PATENT DOCUMENTS 4,833,584 A * 5/1989 Divan .............................. 363/37
5,160,396 A * 11/1992 Jensen et al. ................ 156/304.2

FOREIGN PATENT DOCUMENTS

WO    WO 82/02593 A1    8/1982

*Primary Examiner* — Michael N Orlando
*Assistant Examiner* — Joshel Rivera
(74) *Attorney, Agent, or Firm* — Knobbe Martens Olson & Bear LLP

(57) ABSTRACT

Pipes of a weldable polymer material are welded with a muff of a weldable polymer material. The method includes placing the muff with an overlap over the ends of the pipes, welding the muff to the ends of the pipes through placement of an electrically conducting band that is permeable to molten plastic between the pipe and the muff, connecting a power supply to the band through feed cables, and supplying an electrical current in order to heat the band and the surrounding polymer material such that they melt together around the band in order to form a weld. The temperature of the weld is calculated through adding the initial ambient temperature of the weld and the increase in temperature of the band.

12 Claims, 6 Drawing Sheets

(51) Int. Cl.
  *B29C 65/34* (2006.01)
  *B29C 65/00* (2006.01)
  *F16L 47/02* (2006.01)
  *G01K 7/16* (2006.01)
  *G05D 23/24* (2006.01)
  *F16L 59/20* (2006.01)
  *B29C 65/78* (2006.01)
  *B29L 23/00* (2006.01)

(52) U.S. Cl.
  CPC .... *B29C 66/91315* (2013.01); *B29C 66/91317* (2013.01); *B29C 66/91411* (2013.01); *B29C 66/91431* (2013.01); *B29C 66/91653* (2013.01); *B29C 66/91655* (2013.01); *B29C 66/961* (2013.01); *F16L 47/02* (2013.01); *F16L 59/20* (2013.01); *G01K 7/16* (2013.01); *G05D 23/2401* (2013.01); *B29C 65/3476* (2013.01); *B29C 66/71* (2013.01); *B29L 2023/225* (2013.01); *G01K 2217/00* (2013.01)

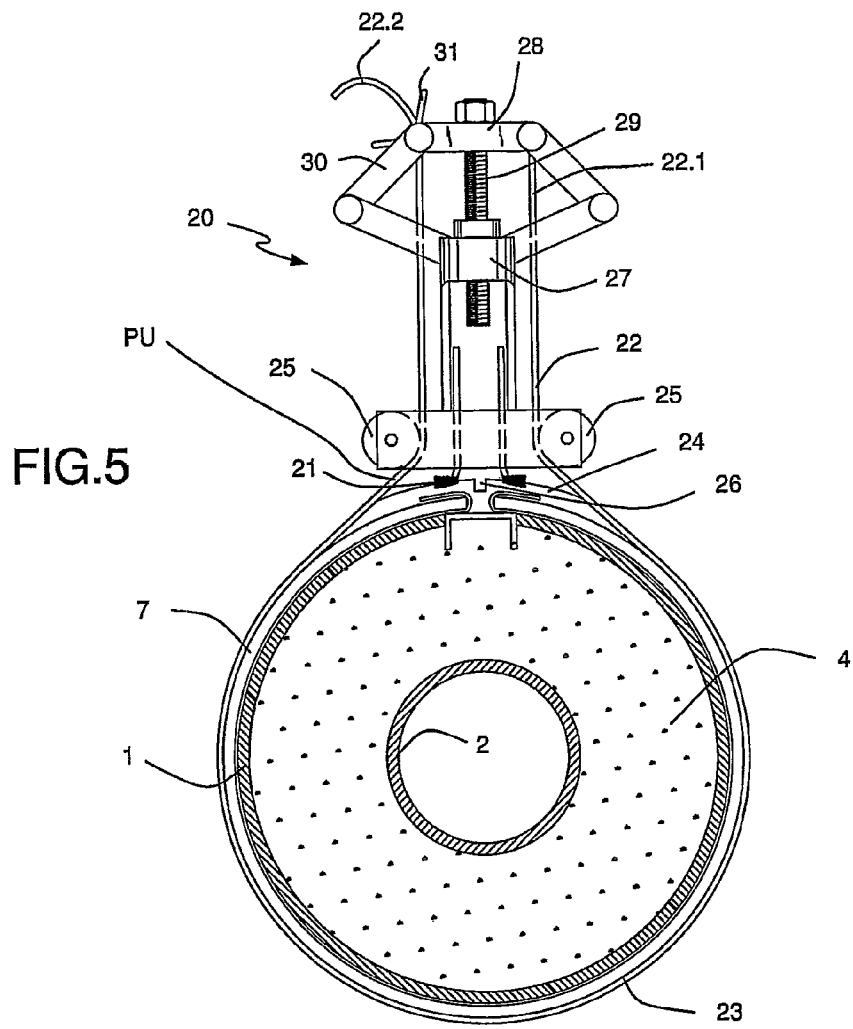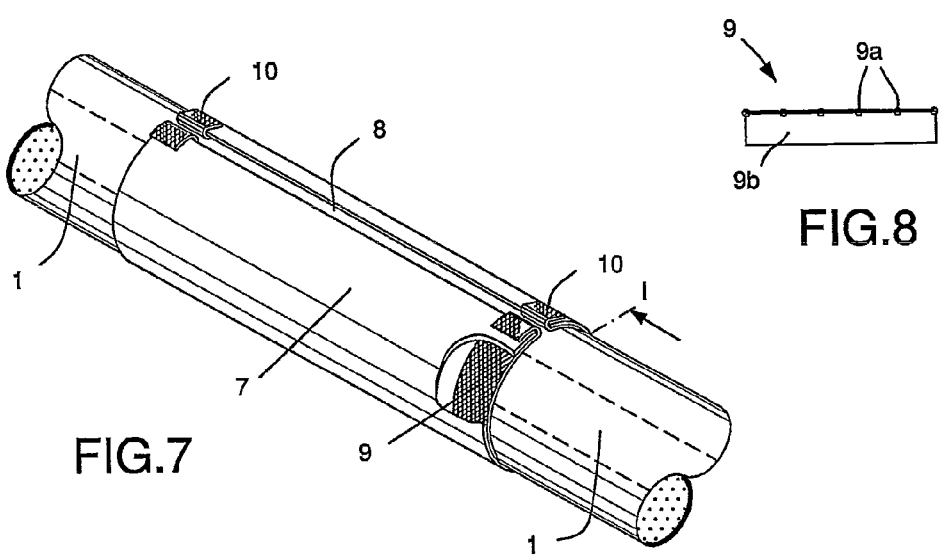

METHOD AND DEVICE FOR THE WELDING OF PIPES

TECHNICAL AREA

The present invention concerns a method and a device for the welding of pipes of a weldable polymer material.

BACKGROUND

The welding together of pipes of weldable polymer material through the use of a muff, a cylindrical pipe connector of weldable material that comprises a heating element, is known. The ends of the pipes are introduced into the muff and form a weld area together with the muff. The heating element, which is normally a coil, is supplied with current that heats the ends of the pipes and the muff in the weld area to such a high temperature that the ends of the pipes and the muff are welded together. Heat must be supplied during a sufficiently long period for the temperature in the weld area to become sufficiently high for a mechanically strong and sealing weld of high quality to be formed. If insufficient heat is supplied, parts of the weld area will not reach the desired temperature and the expected melting will not occur, and this will result in the weld being of lower quality. In contrast to this, if too much heat is supplied it is the case that there is a risk that the material in the ends of the pipes and the muff will be damaged through deformation of the pipe. It is therefore important to control carefully the supply of heat such that sufficient heat is supplied during a certain period of time, such that a weld of high quality is formed between the ends of the pipe and the muff.

In order to solve this problem, the placing of a thermoelement in the weld area takes place. The temperature can in this way be measured and, based on this, it can be determined how the temperature in the weld is developing and when the welding operation is to be ended. It has, however, proved to be the case that thermoelements are difficult to place in a satisfactory manner in the weld area and, furthermore, that thermoelements indicate the temperature at only a single point. There is also a risk that electrical contact will arise between the thermoelement and the heating element, leading to measurement errors. Furthermore, external measuring instruments may be needed in order to control the temperature development, which leads to more extensive equipment and higher costs.

A second existing method to control the heat supply is to use an empirical method, prediction, through, for example, ending the welding operation after a certain pre-determined period of time, which is intended to correspond to a certain temperature in the weld area. It is, however, uncertain whether the strength and quality of the weld that is formed correspond to the stringent requirements, since external factors will always directly influence the result.

DESCRIPTION OF THE INVENTION

One purpose of the present invention is to offer a method and a device that make possible in a simple, efficient and secure manner reliable temperature control and control of the heat supply to a weld area during the welding of pipes of weldable material, such that a high-quality weld is formed.

This purpose is achieved with a method for the welding of pipes of a weldable polymer material, where the pipe has ends, and a muff of a weldable polymer material. The method comprises the placing of the muff overlapping with the ends of the pipes, and the welding of the muff to the ends of the pipes through the placing between the pipe and the muff of an electrically conducting band that is permeable to molten plastic, and the connection of a power supply to the band by supply cables. Electrical current is supplied to heat the band and the surrounding polymer material such that they melt together around the band to form a weld. The method comprises that the initial ambient temperature of the weld is measured before the band is heated, that a voltage $U_L$ across the band is measured, that the electrical current $I_L$ supplied to the band is measured, that the initial resistance $R_0$ of the band is measured before the band has been significantly heated, that the electrical current supplied to the band is caused to increase, that the resistance R of the band is calculated based on the voltage $U_L$ and the measured current $I_L$, that the change in resistance of the band is calculated, that the increase $\Delta T$ in temperature of the band is calculated based on the change in resistance, and that the temperature $T_W$ of the weld is calculated through the adding together of the initial ambient temperature of the weld and the increase $\Delta T$ in temperature of the band.

One advantage of the method according to the invention is that the calculated resistance R corresponds to the resistance in the complete electrically conducting band. The increase in temperature of the weld that is calculated based on the change in resistance in the complete band thus corresponds to the average increase in temperature of the complete weld.

The method means that the temperature during the welding operation of the pipe is monitored. This gives very reliable information about whether the supply of heat to the weld is sufficient to ensure that the weld that is formed satisfies the stringent requirements for homogeneity, mechanical strength and sealing. Thus, the method according to the invention is an efficient way of monitoring the welding operation and the resulting weld.

A further advantage of the method according to the invention is that the determination of the temperature $T_W$ of the weld and the monitoring of the increase in temperature of the weld take place through calculation of the change in resistance based on direct measurement of the current $I_L$ that is supplied and the voltage $U_L$ across the band during the complete welding operation. A reliable and secure result is obtained in this way in which the influence of sources of error has been minimised.

It is known that the resistance of a metal increases with increasing temperature. The temperature coefficient of resistance represents this correlation and is a well-known specific material property.

A further advantage of the method is that the relative change in resistance of the band can be calculated, and thus it is not necessary that the absolute value of the resistance of the band lies at a certain predetermined level, but only that it can be continuously determined. The change in temperature of the weld is calculated based on the relative change in resistance and the temperature coefficient of resistance. This means that the determination of the temperature of the weld is independent of the dimension of the pipe and the dimension of the band.

The calculated temperature of the weld is compared with a pre-determined final temperature of the weld. Welding continues until the temperature of the weld has achieved the final pre-determined temperature of the weld and has remained stable, been maintained, at the final pre-determined temperature of the weld for a pre-determined period of time. The welding operation is terminated after the end of the pre-determined period of time. The welding operation is terminated when the temperature of the weld has achieved the final pre-determined temperature of the weld, and has remained stable for a pre-determined period of time at this temperature.

The welding operation can, alternatively, be terminated when a pre-determined change in resistance of the band has been achieved. The welding operation can, of course, be terminated also after a certain period of time.

At least one power supply connected to a source of voltage such as the grid voltage is used to obtain the current. The power supply may be a direct current supply or an alternating current supply. An alternating current supply working at a high frequency is to be preferred due to its lower cost and weight.

For the supply of alternating current, particularly at high frequencies, the calculation of the resistance according to the method should be adapted such that an impedance is calculated for a circuit comprising the power supply, the feed cables and the band. Since the impedance is a complex number, it is advantageous that the resistance of the band be calculated based on the impedance of the circuit with compensation for the inductance and the resistance in the feed cables.

The invention concerns also a device for the welding of a pipe of weldable polymer material, where the pipe has ends, and a muff of a weldable polymer material, and where the muff is placed overlapping the ends of the pipe, where the device comprises an electrically conducting band that is permeable to molten plastic and that is placed between the ends of the pipe and the muff, and a power supply PU-DC, PU-AC for the supply of an electrical current that is to be connected to the band through feed cables for the heating of the band and surrounding polymer material such that they melt together around the band in order to form a weld, where the device comprises a control and regulatory unit SR that has means CS that measure and regulate the electrical current that is supplied to the band and means VS that measure and regulate the voltage $U_L$ across the band, a thermoelement TS for the measurement of the initial ambient temperature $T_0$ of the weld, and a calculator unit CU for the calculation of the resistance R in the band L, 9 and the temperature $T_W$ of the weld.

The device according to the invention demonstrates corresponding advantages and technical properties as the above-described method.

The invention thus defines a method and a device for the welding of pipes of a weldable polymer material under temperature control.

Embodiments given as examples are revealed in the dependent claims.

Further distinctive features and advantages of the invention will be made clear in the following detailed description of the invention, which constitutes an example and is therefore not to be interpreted in such a manner that the features and advantages are limiting for the protective scope of the invention. References to the attached drawings have been included in the text in order to facilitate understanding, where equivalent or similar parts have been given the same reference symbol.

BRIEF DESCRIPTION OF DRAWINGS

FIG. 5 shows an example of a pipeline that can be welded with the method and the device according to the invention.

FIG. 7 shows a muff and an electrically conducting band shown in FIG. 5.

FIG. 8 shows a band in a transverse cross section.

DETAILED DESCRIPTION AND EMBODIMENTS

The method and device according to the invention are admirably suitable for use for the welding of all types of pipelines of weldable polymer material. The method is particularly advantageous for use during the installation and repair of insulated pipelines such as district heating lines, district cooling lines and pipelines for oil that consist of an outer pipe of a weldable polymer material, such as polyethylene, what is known as PEHD, and an inner pipe that normally consists of steel embedded in insulation of polyurethane foam (PUR).

Figure 1A:
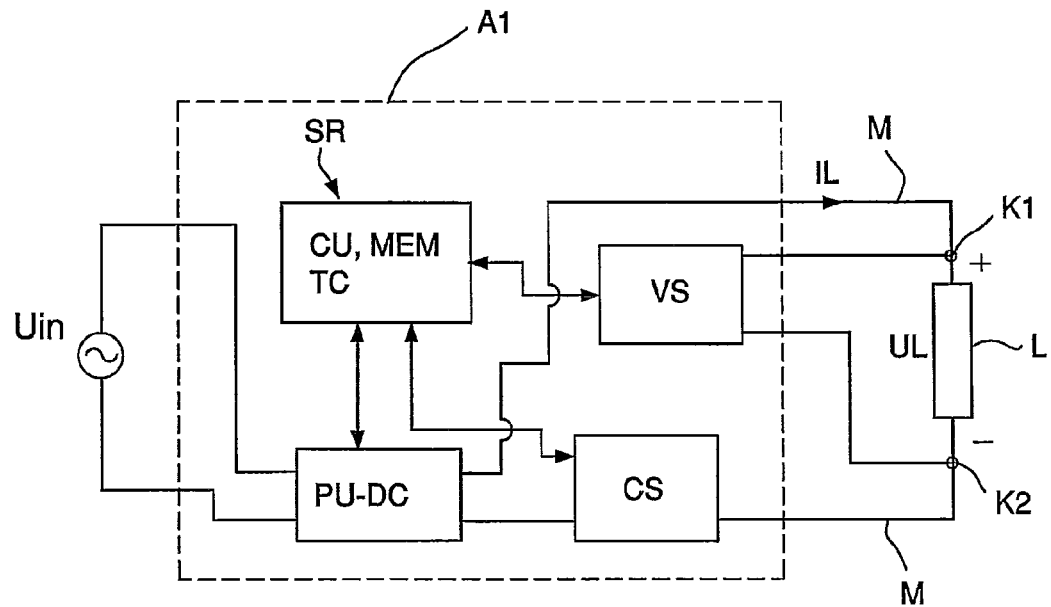
FIG. 1A shows schematically a device according to one embodiment of the present invention, arranged at a weld area.

FIG. 1A shows schematically a device A1, welding equipment, according to one embodiment of the present invention, arranged at a weld area. The device comprises a power supply PU-DC and a load L that comprises an electrically conducting band and feed cables M.

The power supply PU-DC is a direct current supply of traditional nature that has, for example, a 50 Hz transformer with hard-switched power-supply electronics and rectifiers. Such a power supply normally works in the frequency range 75-150 kHz and the output voltage must be rectified and filtered such that the requirements of the EMC Directive are satisfied. The power supply PU-DC is connected to the load L, the electrically conducting band, by feed cables M and thus forms an electrical circuit.

The device A1, the welding equipment, comprises also a control and regulatory unit SR with a voltage sensor VS and a current sensor CS. The voltage sensor VS is connected to connection points K1, K2 arranged adjacent to the load L, the band, for the measurement of the voltage $U_L$ across the band.

A weld area is described below and shown in FIGS. 5-8 where an electrical band 9 is introduced between two ends of the pipe 1a and 1b and a muff 7 of weldable polymer material.

The load L, the band, may comprise a net or other body having the nature of a net, of a stainless steel expander metal with openings arranged regularly across the surface. This may be, for example, a thin sheet of stainless steel that has been perforated with small rectangular holes such that a well-defined net structure has been formed. The parameters of the material, such as its temperature coefficient of resistance, are thus known. It is advantageous to select a band, a net, that has a temperature coefficient of resistance within a relatively narrow range, such that it is possible to calculate the rise in temperature with an acceptable precision.

The load L, the band, is connected through feed cables M to the power supply PU-DC such that it is able to supply a current $I_L$ that is sufficient to heat the band and the surrounding weld area to a temperature that melts the polymer material, the plastic material, such that they melt together around and through the band in order to form a weld.

The control and regulatory unit SR, for example a computer unit, is used to control, regulate and monitor the welding operation.

The control and regulatory unit SR comprises means CS for the measurement and regulation of the electrical current $I_L$ that is supplied to the band, for example a current meter, an ammeter, a current sensor or a current transformer.

The control and regulatory unit comprises also means VS, for example a voltmeter or voltage sensor, for the measurement and regulation of the voltage $U_L$ that is supplied to the band.

The voltage sensor VS can measure the voltage $U_L$ across the band at the connection points K1, K2 arranged adjacent to the load L, the band. Sources of error in the measurement such as the voltage drop in the feed cables M are in this way avoided. The voltage drop in the feed cables M varies, depending on the length of the feed cables, and thus it is advantageous to measure the voltage directly adjacent to the load, the band.

The control and regulatory unit SR comprises also means TS, such as a thermoelement or a temperature sensor, for the measurement of the initial ambient temperature of the weld. The temperature sensor TS is located such that the ambient temperature at the location of the installation adjacent to the pipe and muff can be measured.

The control and regulatory unit SR comprises also a calculation unit CU for the continuous calculation of, for example, the resistance R and the change $\Delta R$ of resistance in the band, the relative change $R_{rel}$ in resistance, the temperature of the band and the change $\Delta T$ in temperature, and the temperature $T_W$ of the weld.

The control and regulatory unit SR comprises also a memory unit MEM that has factory-calibrated information stored in it about the temperature coefficient of resistance and other material-specific parameters for various types of band or net that are used during welding operations of this type, and information concerning a material-specific conversion factor for the calculation of the temperature in the weld. The conversion factor is a direct function of the temperature coefficient of resistance. If the resistance R of the band increases by, for example, 20% for a change in temperature of 200° C., the conversion factor for obtaining the actual change in temperature in Celsius degrees will be 10.

The memory unit MEM has also information about the correlation between the change in resistance and the change in temperature in the band, and about the relationship between the temperature of the weld and the dimension of the pipe and other operating conditions. The memory unit MEM comprises also information about functions that are necessary for calculations in the calculation unit. The memory unit continuously stores information concerning, for example, the welding operation such as information about duration, temperature, current supplied $I_L$ to the band and voltage $U_L$ across it, the initial resistance R of the band and the resistance of the band during the welding process.

Figure 1B:
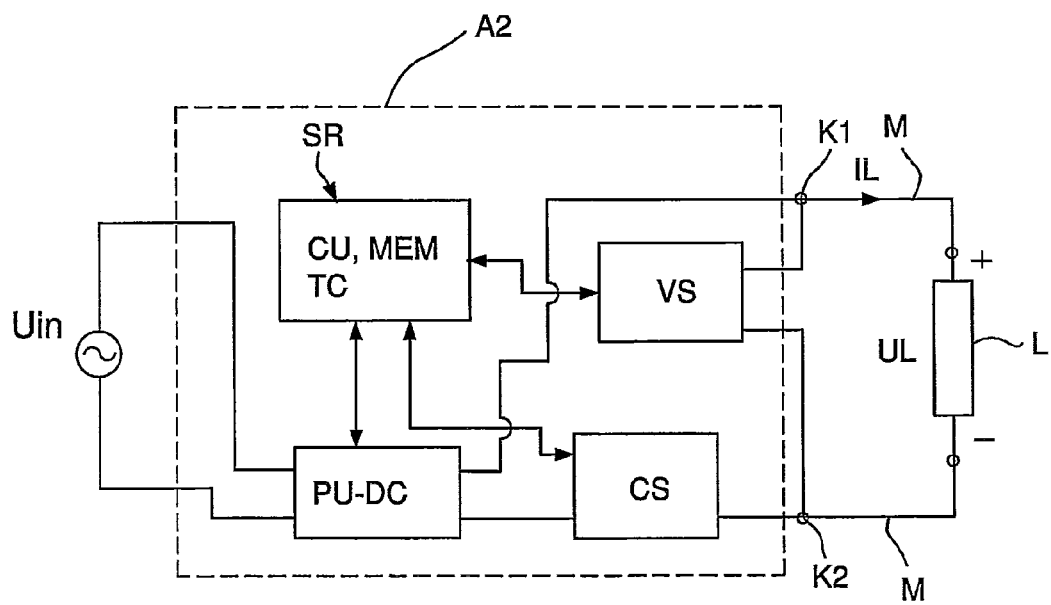
FIG. 1B shows schematically a device according to a second embodiment of the present invention, arranged at a weld area.

FIG. 1B shows schematically a second embodiment of the device A2 according to the invention where the voltage sensor VS measures the voltage $U_L$ at connection points K1, K2 arranged directly at the output of the power supply PU-DC. The voltage sensor VS is so designed that it includes compensation for the fall in voltage along the feed cables.

Figure 2:
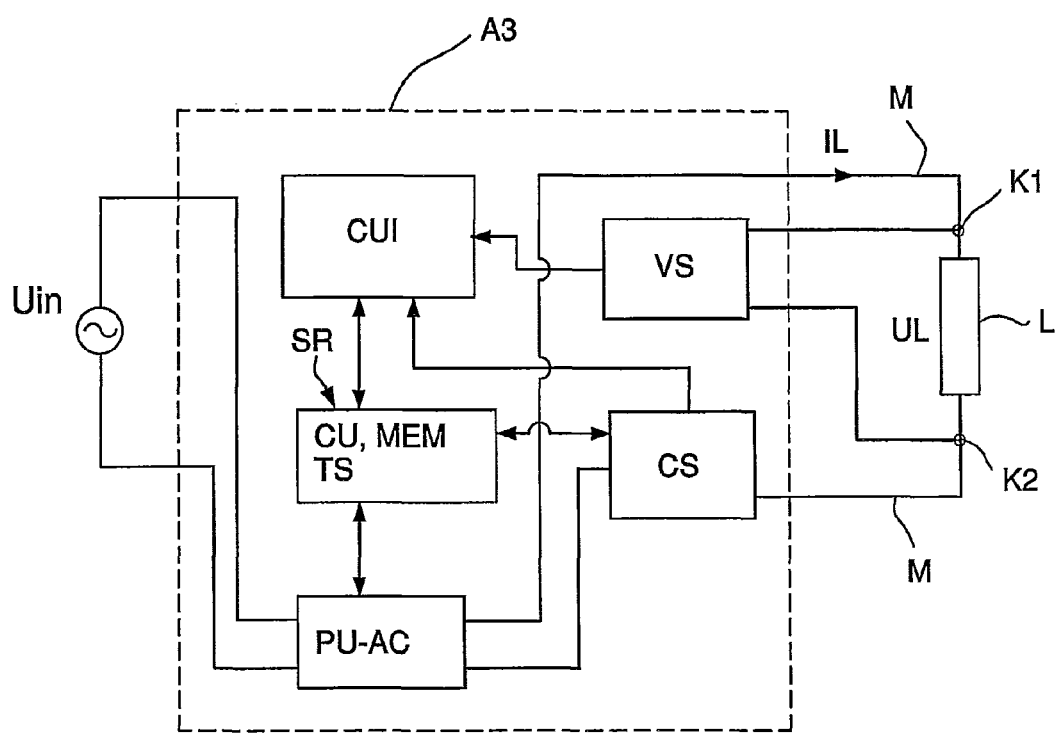
FIG. 2 shows schematically a device according to a further embodiment of the present invention, arranged at a weld area.

FIG. 2 shows schematically a further embodiment of the device A3 according to the present invention. The device A3, the welding equipment A3, comprises a power supply PU-AC and a load L comprising an electrically conducting band, with feed cables M. The power supply PU-AC is connected to the electrically conducting band, the load, by the feed cables M and forms thus an electrical circuit.

The power supply PU-AC is an alternating current supply of traditional nature with thyristor operation.

The alternating current supply PU-AC may, as an alternative, comprise a quasiresonant power converter B of the type that is described below and shown in FIGS. 3 and 4. Such a power converter functions particularly efficiently at frequencies in the interval 20-50 kHz, and it has an optimal size and weight. This power supply has a robust design without any rectifiers or filter circuits at the power outlet at all, which is very advantageous. This leads to reduced costs, higher efficiency and lower volume and weight of the power supply. The quasiresonant converter B is designed with a power semiconductor and a transformer, which gives a current with the form of a sine wave. An advantageous voltage characteristic is obtained in the frequency range 20-50 kHz with a low content of overtones and one that does not need to be filtered, in contrast with the case in which the power conversion takes place at higher frequencies and at the DC output, which is a variant of the traditional technology.

The control and regulatory unit SR in the welding equipment A3 comprises also a control unit CUI for the impedance. Since the power supply PU-AC measures the alternating current to the load L, the band, the control unit for the impedance CUI calculates the impedance for a circuit that comprises the power supply, the feed cables and the band. The load L is treated as a complex impedance during the measurement of alternating current with high frequencies. When calculating the resistance of the band, the resistance should therefore be calculated based on the impedance of the circuit with compensation for the inductance and resistance in the feed cables.

The Welding Process

It can be assumed that the initial temperature of the weld area before the welding operation corresponds to the ambient temperature of the site of installation. The ambient temperature depends on the site of installation and the season, and generally lies within the interval −30° C. to +40° C.

The initial ambient temperature $T_0$ of the weld is measured with the temperature sensor TS in the control and regulatory unit SR, before the current is connected to the band and the band is heated.

The welding process is started by the feed of a reduced current to the welding tool, the band. The current may be direct current or alternating current. At a very early time, within approximately 1 second of the start of the welding process, before the weld has been heated, the electrical current $I_L$ supplied to the band is measured by the current measurer and the voltage $U_L$ across it is measured by the voltage measurer. Based on the current and the voltage, the control and regulatory unit calculates the initial resistance $R_0$ of the band, before it is heated. The resistance R is calculated in the calculation unit CU, based on the voltage and the measured current, and it corresponds to the ratio U/I. The information about the initial resistance $R_0$ is stored in the memory unit. The control and regulatory unit measures the electrical current $I_L$ supplied continuously with the current measurer CS and the voltage $U_L$ across the band with the voltage measurer, during the complete welding operation.

The control and regulatory unit SR subsequently causes the electrical current supplied to the band to increase. The initial current to the band may be, for example, approximately 15-18 A, and it may rise during the welding operation to 25-30 A. This causes the ratio U/I, which corresponds to the resistance R in the band, to increase as the temperature gradually rises. The resistance R in the band and the change $\Delta R$ in resistance in the band are calculated by the calculation unit CU during the complete welding operation. The resistance R corresponds to the resistance in the complete electrically conducting band.

The calculation unit CU subsequently calculates the increase $\Delta T$ in temperature of the band, based on the change $\Delta R$ in resistance and the material-specific conversion factor.

It can be assumed that the temperature $T_W$ of the weld differs only very little from the temperature of the band. The temperature $T_W$ of the weld is calculated, therefore, by adding the initial ambient temperature $T_0$ of the weld and the increase $\Delta T$ in temperature of the band.

Since the calculated increase in temperature of the weld is calculated based on the change in resistance in the complete band, the calculated increase in temperature of the weld corresponds to the average increase in temperature of the complete weld.

The determination of the temperature $T_W$ of the weld and the monitoring of the increase in temperature of the weld take place through calculation of the resistance R and the change $\Delta R$ in resistance based on direct measurement of the current $I_L$ that is supplied and the voltage $U_L$ across the band during the complete welding operation. A reliable and secure result is obtained in this way in which the influence of sources of error has been minimised.

The instantaneous temperature $T_W$ of the weld is controlled according to a pre-determined curve that depends on the dimension of the pipe and the operating conditions. The welding operation is completed when the temperature of the weld has risen and has followed the complete trajectory according to these curves.

During the welding operation, the calculated temperature $T_W$ of the weld is compared with a pre-determined final temperature $T_f$ of the weld. It has proved to be the case, for example, that a weld of a pipe consisting of polyethylene, for example polyethylene of high density PEHD, should be heated to approximately 250° C. in order to obtain a weld of high quality.

The relative change $R_{rel}$ of resistance in the band can be calculated during the welding operation. The relative change in resistance is represented as a percentage change from the initial resistance $R_0$. Based on the relative change $R_{rel}$ in resistance and the known temperature coefficient of resistance, also the change of temperature of the weld can be calculated. This is advantageous since the determination of the temperature $T_W$ of the weld is then independent of the dimension of the pipe and the dimension of the band.

Welding continues until the temperature $T_W$ of the weld has achieved, has been caused to achieve, the final pre-determined temperature $T_f$ and has remained stable, has been maintained, at the final pre-determined temperature $T_f$ of the weld for a pre-determined period of time. The welding operation is terminated after the end of the pre-determined period of time. The welding operation is terminated when the temperature of the weld has achieved, and has remained stable for a pre-determined period of time at, the final pre-determined temperature $T_f$ of the weld. The period of time is determined by operating conditions such as, for example, the thickness of the pipe wall.

The welding operation can, alternatively, be terminated when a pre-determined change $\Delta R$ in resistance of the band has been achieved. The advantage of terminating the welding operation when a predetermined change in resistance has taken place is that the change in resistance corresponds to a certain rise in temperature in the complete band, which is essentially the same as the rise in temperature in the weld area where the band is in contact with the pipe and muff. The heat supply can in this way be efficiently and accurately controlled.

The method thus means that the temperature during the welding of the pipe is controlled through the average temperature in the complete weld being determined. Through the average temperature in the complete weld being continuously determined during the welding operation, the heat supply can be accurately controlled and monitored.

The temperature of the band initially rises somewhat more rapidly than the actual temperatures in various parts of the weld. The temperatures of the material in the pipe walls and the walls of the muff, for example, rise gradually during the welding operation. Temperature gradients arise for this reason in the wall of the pipe and the muff during the initial phase of the welding. After the welding operation has been carried out for a period, the temperature gradients are evened out and the material in the wall of the pipe and the muff, throughout and around the material, reaches the desired melting temperature and a high-quality weld is formed.

In order to compensate for the difference between the temperature of the band and the actual temperature of the weld, current is supplied such that the temperature of the band is caused to reach a first elevated target value $T_1$ of the temperature during a heating phase of the welding operation. The first target value of the temperature is selected such that it exceeds the pre-determined final temperature of the weld $T_f$ by a value that depends on the actual dimension of the pipe.

The heating phase continues for a pre-determined period of time. The increase in temperature in the weld is started during the heating phase, and good contact is created between the band, the pipe and the muff.

A equalisation phase in the welding operation then follows in order to make possible a temperature equalisation of the temperature gradients in the material, and such that a homogeneous weld is to be formed. The pipe and the muff are caused to reach the desired pre-determined final temperature $T_f$ of the weld during this equalisation phase. The current is gradually reduced during the equalisation phase such that the temperature of the band is caused to reach a second target value $T_2$ of the temperature that is somewhat lower than the first target value $T_1$ of the temperature. The first target value $T_1$ of the temperature is thus higher than the second target value of the temperature $T_2$. The second target value $T_2$ of the temperature is selected such that it lies very close to the pre-determined final temperature $T_f$ of the weld. The temperature $T_w$ of the weld is stabilised at the pre-determined final temperature $T_f$ of the weld during the equalisation phase, and the temperature gradients in the material in the pipe wall and muff are equalised, and the complete material reaches the pre-determined final temperature $T_f$ of the weld. The welding operation is ended when the temperature $T_w$ of the weld has reached the pre-determined final temperature $T_f$ of the weld and the equalisation phase has lasted a certain pre-determined period of time. The period of time is determined by operating conditions such as the thickness and nature of the material. This is carried out in order to further ensure that the weld has the quality desired and that temperature gradients in the material have been equalised.

It is preferable that the measurement of the current supplied $I_L$ and of the voltage $U_L$ take place continuously, as long as the welding operation takes place. It is advantageous that also the calculations of the resistance R of the band, the change $\Delta R$ in resistance in the band, the relative change $R_{rel}$ of resistance of the band, the change $\Delta T$ in temperature of the band and the calculation of the temperature $T_W$ of the weld are carried out continuously in order to achieve good control of the heat supply to the weld.

Figure 3:
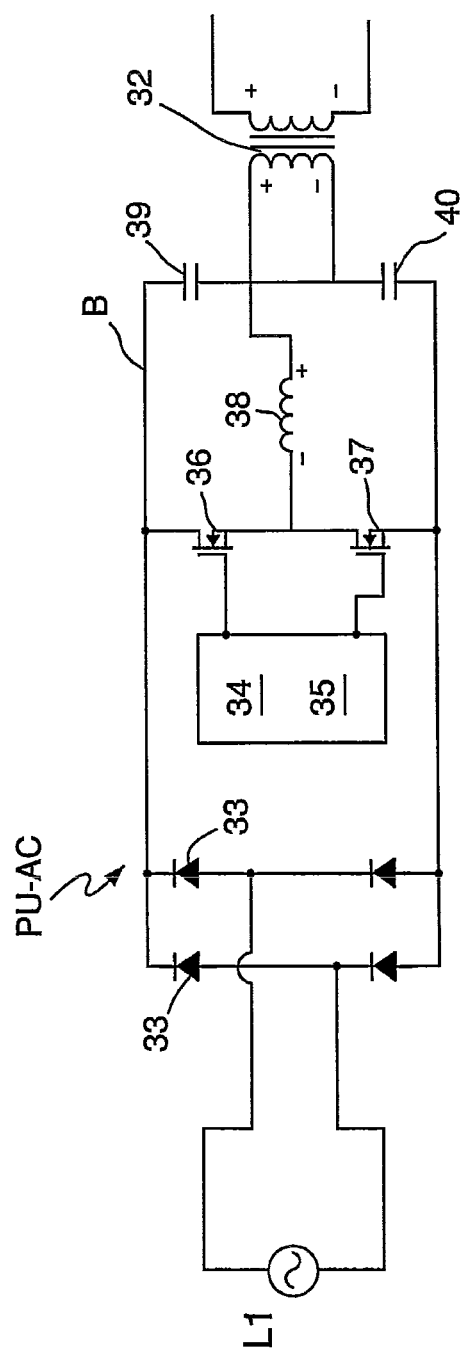
FIG. 3 shows a circuit diagram for a power supply that can be used in a device according to the invention shown in FIG. 2.

FIG. 3 shows a circuit diagram for a power supply PU that has a quasiresonant power converter B and that is connected to grid voltage, and a transformer 32 that is connected to the welding equipment and the electrodes 21. The quasiresonant converter B has diodes 33 for full-wave rectification, a combined FET-driver 34 and oscillator 35, and a half-bridge 36, 37 with semiconductors. The power converter B has also a choke 38 and a capacitive voltage divider with two condensers 39, 40 connected in series with the primary coil 32 of the transformer. This connection creates, at frequencies greater than the resonance frequency, zero-voltage switching and a current that has the form of a partial sine wave where the choke 38 forms the up-slope and the condensers 39, 40 forms the down-slope of the current through the transformer (from which the name "quasiresonant" is derived). This is advantageous since a low content of overtones is obtained, and the requirements relating to electromagnetic interference (EMC) are easy to achieve in the complete construction, without extensive filtering.

The quasiresonant power converter B works preferably, as has been previously mentioned, at a frequency in the interval 20-50 kHz. The said frequency interval means that special elements that are commercially known as "IGBT modules" (which is an abbreviation for "insulated gate bipolar transistor modules") are particularly suitable for use in the design of the quasiresonant power converter according to the invention.

Also small, light transformers are commercially available that are particularly suitable for use in the power converter B. Such a transformer contributes to a low volume and weight.

Through the design of the power unit in this manner a high efficiency and low requirement for extra filtration are achieved, even though the power output lacks rectifiers and conventional output filters, and the output voltage is, thus, completely unfiltered.

It is important that the power supply PU that is used for welding at the installation and repair of insulated pipes out in the field and at the site of installation be light and easy to use. At the same time, requirements that the power supply for welding should give a high output power have risen. For this purpose, two power supplies PU-AC with quasiresonant power converters B in the same unit are offered, which unit then can be used for separate operation during welding each of one weld simultaneously or connected in series for full power when welding a large weld with a diameter of up to 2 meters.

Figure 4:
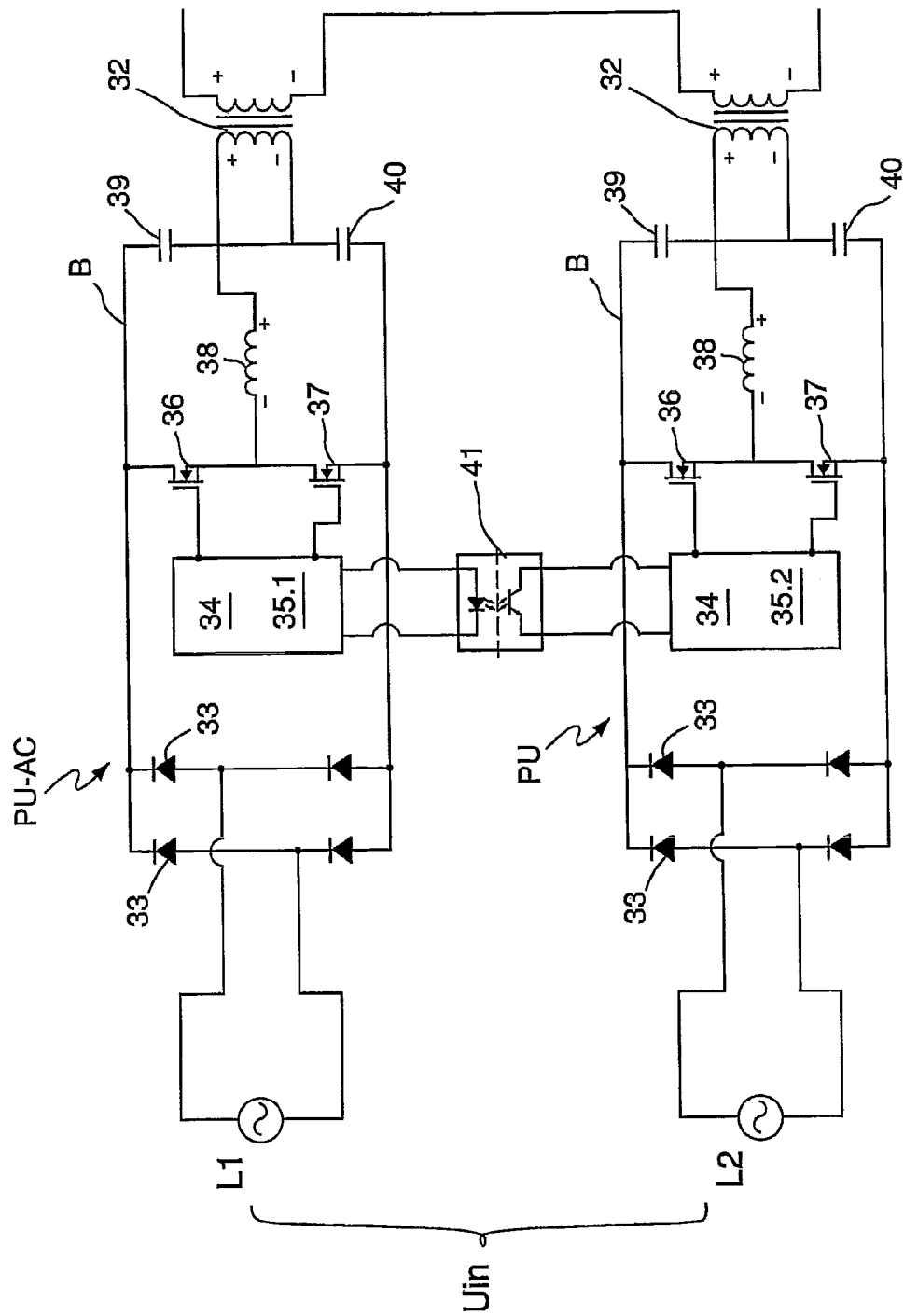
FIG. 4 shows a circuit diagram for two power supplies of the type shown in FIG. 3 that are connected in series and that can be used in a device according to the invention shown in FIG. 2.
Figure 6:
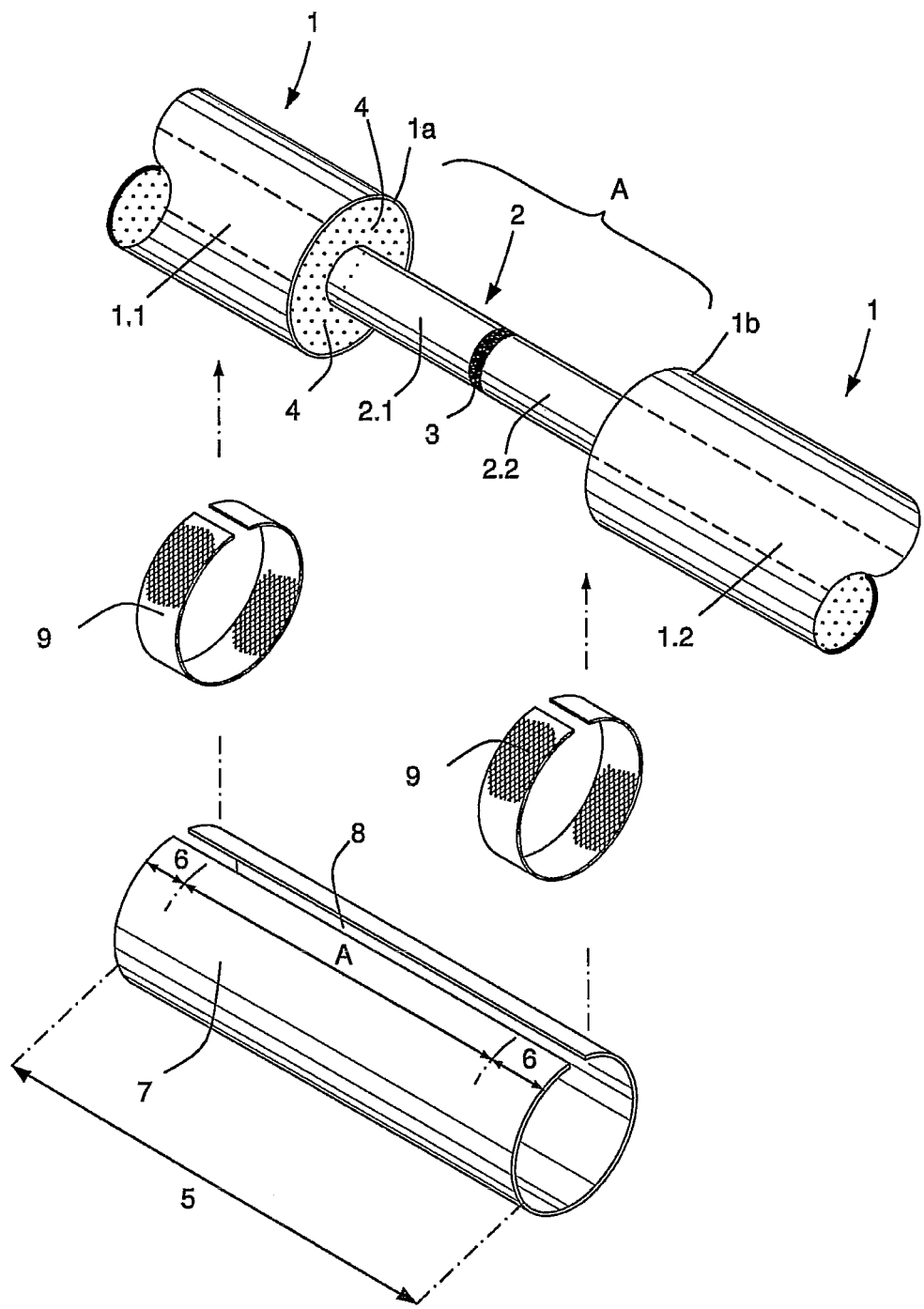
FIG. 6 shows schematically a perspective view with separated parts of a pipe junction shown in FIG. 5.

FIG. 4 shows a circuit diagram for two power supplies PU that comprise quasiresonant power converters B where the power supplies are connected in series on the output side in order to interact and increase the power value of the output voltage. This is advantageous when a high output voltage is required, during the welding of large welds, for example, up to 2 meters. The two quasiresonant power converters B operate synchronously and carry out a summation, a summation function, of the output voltage, which results in the fact that no previous correction, rectification or filtration of each output needs to take place. This results in efficient power conversion and supply of current, which take place without loss of energy. Each one of the power supplies may be connected to its own source of voltage, but it is very advantageous to connect each one of the power supplies to its own phase L1 and L2 of the same source of voltage, as shown in FIG. 4. The power outtake in this way is effectively limited to 16 A per phase for three-phase supply, which is the normal fused level for three-phase supply, while the maximal power outtake is doubled.

The connection in series is achieved through connecting the secondary side of each transformer. In order to make possible a doubling of the effective value of the output voltage, the oscillators are synchronised through an insulated signal transfer connection 41, through, for example, optocouplers, signal transformers or similar insulated signal transfer components. The quasiresonant converters are in this way forced to operate completely (100%) synchronously. This leads to the effective value of the output voltage being doubled, since the output voltage at the transformers lies 100% in phase with respect to the switching frequency of the half-bridges. The input voltage to the quasiresonant converters lies 120 degrees displaced in phase, but this does not affect the doubling of the effective value of the output voltage.

FIGS. 5-8 show an example of a pipeline that can be welded with the device according to the invention. The pipeline is, for example, a district heating pipeline, a district cooling pipeline or a pipeline for oil that consists of an outer pipe of a weldable polymer material, such as polyethylene of the type polyethylene high density (PEHD), and an inner pipe that normally consists of steel embedded in insulation of polyurethane foam (PUR).

It is of the highest importance to achieve installations, joins, of high quality and strength, both during new installation and during repair of the pipelines. Unreliable quality, or in the worst case systematic errors in the assembly, may in the long term be disastrous for the overall economy of a district heating network.

FIG. 5 shows a pipeline comprising an outer pipe 1 of a weldable polymer material and an inner pipe 2 of steel.

The work is normally started when installing new pipelines by the laying of at least two district heating pipes one after the other. Two protruding inner pipes 2.1 and 2.2 that are normally of steel face towards each other and are subsequently welded together, forming a weld 3.

The mounting of a muff 7 of a weldable polymer material takes place in order to connect the two outer pipes 1.1 and 1.2 to each other. It is preferable that the length 5 of the muff be the same as the distance A between the ends 1a and 1b of the outer pipes with an addition of length corresponding to the overlap 6 of the muff for the desired width of the weld on each side. It is appropriate that the overlap 6 of the muff be sufficiently long such that the overlap 6 can participate in a surrounding weld that welds together the outer pipes 1.1 and 1.2 with the muff 7. The width of the surrounding weld in one embodiment is 40 mm and the overlap 6 at each end of the muff is 100 mm.

The muff 7 is cut along its longitudinal direction such that a longitudinal slit 8 is formed. The slit 8 makes it possible to place the cut muff 7 over the exposed section A of the inner pipe 2, or the inner pipes 2.1 and 2.2, with overlap of the ends 1a and 1b of the outer pipes, even if the inner pipe 2 is intact.

The muff 7 is placed over the join, over the exposed section A of the inner pipe 2, or 2.1 and 2.2, with overlap of the ends 1a and 1b of the outer pipes.

A band 9 that is electrically conducting and permeable to molten plastic is cut to a length that exceeds the circumference of the outer pipe. The band 9 may comprise a net 9a, with openings of stainless steel expander metal arranged regularly over its surface, such as a thin sheet of stainless steel that has been perforated.

The band 9 is introduced between one of the outer pipes 1.1 or 1.2 and the muff 7 such that the free ends 10 of the band protrude, upwards, through the slit 8, into which the ends 10 of the band enter from opposite directions. The ends 10 of the band are then folded backwards over the relevant edge of the slit, such that a separation forms between the ends 10 in the slit 8. The band 9, the net 9a, may be laminated with a polymer material 9b. The polymer material 9b is arranged on one side of the net 9a, and when the band 9 is arranged between the outer pipe 1 and the muff 7 the net 9a faces the outer pipe 1 such that the net 9a is facing upwards when the ends 10 of the band are folded over and around the edges of the slit. It is also fully possible to use a band 9, a net 9a, that is not laminated without the functions or advantages of the invention being influenced.

The width of the band 9 is less than the magnitude of the overlap 6. The weld obtains a corresponding width, which is thus also less than the magnitude of the overlap.

Before the application of the band 9 that transfers welding heat, an oxide layer on the polymer surfaces, the plastic surfaces, of both the muff and the pipes is ground away. Oxides and dirt, which have a negative influence on the strength and sealing properties of the weld, are in this way removed.

Furthermore, the use of a net 9a, or at least a construction similar to a net, for heating between the surfaces that are to be welded results in a very even distribution of heat along the complete length and breadth of the weld, whereby a homogeneous weld with very high quality will be the result.

The folded ends 10 of the band, comprising the electrically conducting parts, the net 9a, are then each connected to an electrode 21 that can be connected through feed cables to a power supply PU that it is able to supply a current that is sufficient to heat the band 9 and the surrounding weld area to a temperature that melts the polymer material, the plastic material, such that they melt together around and through the band in order to form a weld.

FIG. 5 shows that the device comprises a clamp 20 for the application of an outer pipe onto an inner pipe, in particular a slit pipe muff 7 applied onto an outer pipeline 1 of a pipe of the type used for district heating pipes and district cooling pipes. The clamp 20 comprises a flexible clamp band 22 arranged in a loop 23 such that the free ends 22.1 and 22.2 of the clamp band can be connected to means 24-30 of applying tension. The clamp band 22, the loop 23, is, when it is arranged around the muff 7, around the circumference of the muff, able to place the muff 7 in contact with the pipe 1 through the influence of the means of applying tension. The means 24-30 of applying tension that can apply, tighten, the loop 23 comprises at one end a support part 24 intended to rest against the muff 7. Furthermore, two parallel break wheels 25 with a mutual separation that is significantly less than the diameter of the muff are arranged in connection with the support part 24. The positions of the break wheels 25 can be adjusted depending on the size, the diameter, of the muff with the aid of a adjustment means, which it is appropriate should be a screw arranged at each end of the relevant break wheel 25, where rotation of the screw displaces the end of the break wheel 25 towards or away from the muff 7. The support part 24 interacts with the clamp band 22 and exerts a clamping force around essentially the complete circumference of the muff.

It is preferable that the support part 24 be concave, following the curved surface of the muff for stable contact. It is further preferable that the support part 24, at least at that part of the surface that is in contact with the muff 7, is made from an electrically insulating material that can withstand also the elevated temperatures that welding entails. Furthermore, it is an advantage if the support part 24 of the tool can be exchanged to ensure good fit to pipes of different diameters, or that it be constructed from a flexible material that adapts the surface of contact to the relevant diameter of pipe. The clamp band 22 in the loop 23 is also made from a flexible material that can withstand elevated temperatures. It is appropriate that the clamp band be a band that comprises kevlar and teflon. The clamp band 22 may be, for example, manufactured from kevlar that has subsequently been impregnated or laminated with teflon.

The support part 24 comprises an electrically insulating protrusion 26. It is advantageous that the protrusion 26 comprise heat-resistant insulation in order to reduce the risk of short-circuit and damage during welding around the complete circumference. A ceramic material or similar material that is relatively able to resist heat may, for example, be used, and it is an advantage that a flexible material be used that carefully follows any variations of form that exist. It is intended that the protrusion 26 be inserted into the slit 8 and there enter as a dividing wall between the electrically conducting bands 9, the ends of the band 10, that have been folded over the edges of the slit. The protrusion 26 may be designed as a lip or a ridge. The protrusion 26 is displaceable, it can be slid out to protrude, such that its depth of location into the slit can be varied depending of the wall thickness of the muff.

The electrodes 21 are comprised within the support part 24, one on each side of the protrusion 26, for the connection of an electrical current to the electrical band 9, the ends 10 of which are, as has been previously mentioned, folded up one on each side of the slit 8. The electrodes 21 are spring-loaded to give maximal contact with the band 9. The electrodes 21 are placed in connection by feed cables M with a power supply PU that can supply a regulated and controlled current to the electrodes 21 for a controlled duration.

The example of the design of the means 24-30 of applying tension that has been given may, of course, be varied within the innovative scope of the invention, whereby the application can be achieved with levers or rollers or other linear or non-linear methods of applying tension to a band.

Before the band 9 is heated, the clamp 20 is brought into contact with the muff 7 and the outer pipe 1, which clamp presses the muff 7 against the outer pipe such that the band 9 is held in place between their surfaces.

A check is carried out before the current is applied that all parts are in their correct locations, for example that the band 9 is in the correct location and that the muff 7 overlaps the ends 1a and 1b of the outer pipe to the desired extent, and that feed cables and electrodes 21 are correctly connected to the band 9.

The band 9 in its entirety is heated and the oxide-free plastic surfaces and the polymer material 9b around and comprised within the band 9 melt together. The current is switched off and a broad and completely melted weld has been formed around the band 9.

The clamp 20 is removed and the same welding operation is carried out at the second end of the muff. If two devices according to the invention are available, then both surrounding welds can, of course, be carried out at the same time at each end of the muff.

When the surrounding welds of the muff 7 have been carried out and the clamp 20 has been dismounted, the ends 10 of the band are removed through the milling of a U-shaped weld with a router. Welding of the slit 8 subsequently takes place to create a weld along the complete length 5 of the muff. A continuous welding string is laid along the complete length of the slit 8. It is preferable that what is known as "extrusion welder" is used for extrusion welding, which also supplies material to the weld.

A device according to the invention has a low weight, due to the fact that it contains few components, and this improves considerably the work environment of the mounting personnel, since it is not unusual that work of this nature is carried out in rather complicated situations where access is difficult. The technical distinctive features in the form of parts and fittings that have been described above can be freely combined within the innovative scope of the invention as long as the result corresponds to the design that is described in the patent claims.

The invention claimed is:

1. A method of welding a pipe of a weldable polymer material to a muff of a weldable polymer material, where the pipe has ends, where the method comprises:
   placing the muff with an overlap over the ends of the pipes;
   welding the muff to the ends of the pipes through placement of an electrically conducting band that is permeable to molten plastic between the pipe and the muff;
   connecting a power supply to the band through feed cables;
   measuring the initial ambient temperature of the weld;
   calculating the initial resistance of the band, wherein the initial resistance of the band is calculated as a ratio of voltage across the band and current supplied to the band before the band is heated;
   supplying an electrical current in order to heat the band and the surrounding polymer material such that they melt together around the band in order to form a weld, wherein the current is supplied such that the temperature of the band is caused to reach a first target value of temperature during a heating phase, wherein the temperature of the band is caused to reach a second target value of temperature during an equilibrium phase, and wherein the first target value of temperature is higher than the second target value of temperature;
   measuring a voltage across the band;
   measuring the electrical current supplied to the band;
   causing the electrical current supplied to the band to increase;
   calculating the resistance of the band based on the voltage and the measured current;
   calculating the change in resistance as a difference between the resistance of the band and the initial resistance of the band;
   calculating the increase in temperature of the band based on the change in resistance based on the change in resistance and a material-specific conversion factor;
   calculating the temperature of the weld through adding the initial ambient temperature of the weld and the increase in temperature of the band; and
   terminating supply of current to the band based on the calculated temperature of the weld,
   wherein the calculated temperature of the weld is compared with a pre-determined final temperature of the weld, and
   wherein the supply of current to the band is terminated when the temperature of the weld has reached the pre-determined final temperature of the weld.

2. The method according to claim 1, wherein the supply of current to the band is terminated when a pre-determined change in the resistance of the band has been achieved.

3. The method according to claim 1, wherein the supply of current to the band is terminated when the temperature of the weld has reached the pre-determined final temperature of the weld and has remained stable at the pre-determined final temperature of the weld during a pre-determined period of time.

4. The method according to claim 1, wherein the electrical current is direct current.

5. The method according to claim 1, wherein the electrical current is alternating current.

6. The method according to claim 5, wherein at least one power supply that comprises a quasiresonant power converter is used to obtain the electrical current that is to be connected to the band.

7. The method according to claim 6, wherein the quasiresonant power converter operates at frequencies in the interval 20-50 kHz.

8. The method according to claim 1, wherein an impedance is calculated for a circuit comprising the power supply, the feed cables and the band, wherein the impedance is calculated based on a supplied alternating current to the band, the frequency of the current, and adopting that the band is a complex impedance.

9. The method according to claim 8, wherein the resistance of the band is calculated based on the impedance of the circuit with compensation for the inductance and resistance in the feed cables.

10. The method according to claim 1, wherein a relative change in the resistance of the band is calculated based on the initial resistance and the change in resistance and the increase in temperature of the weld is calculated based on the relative change in the resistance of the band and a temperature coefficient of resistance of the band.

11. The method according to claim 1, wherein the voltage is measured at connection points arranged adjacent to the band.

12. The method according to claim 1, wherein the voltage is measured at connection points arranged directly at the output of the power supply.

* * * * *